(12) United States Patent
Yang et al.

(10) Patent No.: US 9,880,652 B2
(45) Date of Patent: Jan. 30, 2018

(54) DISPLAY SUBSTRATE AND DRIVING METHOD THEREOF, AND DISPLAY DEVICE

(71) Applicants: Boe Technology Group Co., Ltd., Beijing (CN); Beijing Boe Optoelectronics Technology Co., Ltd., Beijing (CN)

(72) Inventors: Shengji Yang, Beijing (CN); Xue Dong, Beijing (CN); Hailin Xue, Beijing (CN); Xiaochuan Chen, Beijing (CN); Haisheng Wang, Beijing (CN); Yingming Liu, Beijing (CN); Weijie Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/521,098

(22) PCT Filed: Oct. 20, 2016

(86) PCT No.: PCT/CN2016/102672
§ 371 (c)(1),
(2) Date: Apr. 21, 2017

(87) PCT Pub. No.: WO2017/071514
PCT Pub. Date: May 4, 2017

(65) Prior Publication Data
US 2017/0357352 A1    Dec. 14, 2017

(30) Foreign Application Priority Data
Oct. 30, 2015 (CN) .......................... 2015 1 0728413

(51) Int. Cl.
G06F 3/041 (2006.01)
G06F 3/044 (2006.01)
G09G 3/3225 (2016.01)

(52) U.S. Cl.
CPC ............ *G06F 3/0412* (2013.01); *G06F 3/044* (2013.01); *G06F 3/0416* (2013.01);
(Continued)

(58) Field of Classification Search
CPC .. G09G 3/3233; G09G 3/3258; G06F 3/0412; G06F 3/0416; G06F 3/0433
(Continued)

(56) References Cited

U.S. PATENT DOCUMENTS

2013/0021285 A1   1/2013   Kimura et al.
2016/0180772 A1   6/2016   Ma
2016/0240136 A1   8/2016   Han

FOREIGN PATENT DOCUMENTS

CN    102834793 A    12/2012
CN    103325339 A    9/2013
(Continued)

OTHER PUBLICATIONS

International Search Report for International Patent Application No. PCT/CN2016/102612 dated Jan. 22, 2017.

*Primary Examiner* — Calvin C Ma
(74) *Attorney, Agent, or Firm* — Calfee, Halter & Griswold LLP

(57) ABSTRACT

A display substrate includes a base, a middle frame below the base and a pressure sensor for sensing a touch operation to generate a touch signal. The pressure sensor includes multiple sensing units, each having a first electrode on the base that deforms in response to the sensed touch pressure; a second electrode between the middle frame and the base that forms a capacitor with the first electrode, the capaci-
(Continued)

tance of the capacitor changing with the deformation of the first electrode; and a sensing circuit electrically connected to the first electrode for transforming changes in the capacitance into electrical signals so as to generate the touch signal.

15 Claims, 3 Drawing Sheets

(52) U.S. Cl.
CPC . *G09G 3/3225* (2013.01); *G06F 2203/04105* (2013.01); *G09G 2310/0289* (2013.01); *G09G 2310/0291* (2013.01)

(58) Field of Classification Search
USPC .................................................. 345/173, 174
See application file for complete search history.

(56) References Cited

FOREIGN PATENT DOCUMENTS

| | | |
|---|---|---|
| CN | 103886838 A | 6/2014 |
| CN | 103996379 A | 8/2014 |
| CN | 205121517 U | 3/2016 |
| CN | 205231063 U | 5/2016 |
| JP | 2000066837 A | 3/2000 |

DISPLAY SUBSTRATE AND DRIVING METHOD THEREOF, AND DISPLAY DEVICE

CROSS REFERENCE TO RELATED APPLICATION

The present application is the U.S. national phase entry of PCT/CN2016/102672, with an international filling date of Oct. 20, 2016, which claims the benefit of Chinese Patent Application No. 201510728413.6, filed on Oct. 30, 2015, the entire disclosure of which is incorporated herein by reference.

TECHNICAL FIELD

The present disclosure relates to the technical field of display, in particular to a display substrate, a driving method for a display substrate and a display device.

BACKGROUND

The OLED (Organic Light Emitting Diode) display is one of the hotspots of study in the field of flat panel display currently. As compared to the liquid crystal display, the OLED display has such advantages as low energy consumption, low manufacturing cost, self-luminescence, wide viewing angle and fast response. Presently, OLED display screens have begun to replace the traditional LCD display screens in the field of displays for mobile phones, PDAs, digital cameras and the like.

A pressure sensing technology refers to a technology that can detect external forces, and following the lead of Apple Inc., many manufacturers are seeking proper solutions to realize pressure sensing in the field of display, especially in mobile phones or flat panel displays, which may enable customers to have better experiences in human-computer interaction. However, the current solutions require much changes to the structure of the display substrate, and due to the large assembling tolerance, the detection accuracy of these solutions is also restricted.

SUMMARY OF THE DISCLOSURE

Embodiments of the disclosure propose a display substrate, into which a pressure sensor can be efficiently integrated.

The display substrate provided by an embodiment of the comprising a base; a middle frame below the base; and a pressure sensor for sensing a touch operation to generate a touch signal. The pressure sensor includes a plurality of sensing units, each sensing unit comprising a first electrode on the base, which deforms in response to a sensed touch pressure; a second electrode between the middle frame and the base, which is configured to form a capacitor with the first electrode, a capacitance of the capacitor changing with the deformation of the first electrode; and a sensing circuit electrically connected to the first electrode for transforming changes in the capacitance into electrical signal so as to generate the touch signal.

In some embodiments, the display substrate further comprises a plurality of pixel units, each pixel unit including a pixel circuit, and pixel circuits of part of the plurality of pixel units are connected to the pressure sensor. The pixel circuit has a first signal input terminal for receiving a light emission control signal, a second signal input terminal for receiving a second control signal, a third signal input terminal for receiving a third control signal, a fourth signal input terminal for receiving a data signal, a fifth signal input terminal for receiving a first voltage and a sixth signal input terminal for receiving a second voltage. The sensing circuit has a reset signal input terminal, through which the sensing circuit receives a reset signal to reset a potential of the first electrode, and the sensing circuit is electrically connected to the second signal input terminal and third signal input terminal of the pixel circuit to sense touch operations of a user under the control of the second control signal and the third control signal.

In some embodiments, the pressure sensor further comprises a processing unit that generates the touch signal based on the change in the capacitance of the capacitor.

In some embodiments, the sensing circuit comprises a seventh transistor, an eighth transistor, a ninth transistor and a reference capacitor, wherein a gate of the seventh transistor is connected to the second signal input terminal, a source thereof is connected to a gate of the eighth transistor, and a drain thereof is connected to a drain of the eighth transistor. A gate of the eighth transistor is connected to the reference capacitor, a source thereof connected to a drain of the ninth transistor, and the drain thereof is further connected to the reset signal input terminal. A gate of the ninth transistor is connected to the third signal input terminal, and a source thereof is connected to a touch signal receiving line. One end of the reference capacitor is connected to the first electrode and the other end thereof is connected to the third signal input terminal.

In some embodiments, the first voltage is a high potential, and the second voltage is a low potential, the pixel circuit comprises a first transistor, a second transistor, a third transistor, a fourth transistor, a fifth transistor, a sixth transistor, and a storage capacitor. A gate of the first transistor is connected to the first signal input terminal, a source thereof is connected to the fifth signal input terminal, and a drain thereof is connected to a source of the sixth transistor. A gate of the second transistor is connected to the third signal input terminal, a source thereof is connected to the drain of the first transistor, and a drain thereof is connected to a gate of the sixth transistor. A gate of the third transistor is connected to the second signal input terminal, a source thereof is connected to the sixth signal input terminal, and a drain thereof is connected to a gate of the sixth transistor. A gate of the fourth transistor is connected to the third signal input terminal, a source thereof is connected to the fourth signal input terminal, and a drain thereof is connected to a drain of a sixth transistor. A gate of the fifth transistor is connected to the first signal input terminal, a source thereof is connected to the drain of the sixth transistor, and a drain thereof is connected to an organic light emitting device. A gate of the sixth transistor is connected to the storage capacitor, one end of the storage capacitor is connected to the fifth signal input terminal, and the other end thereof is connected to the gate of the sixth transistor.

In some embodiments, the first transistor, second transistor, third transistor, fourth transistor, fifth transistor, sixth transistor, seventh transistor, eighth transistor, and ninth transistor are P-channel transistors.

In some embodiments, during a first period of time, a high potential is provided to the first signal input terminal, a low potential is provided to the second signal input terminal, a high potential is provided to the third signal input terminal, and a low potential is provided to the fourth signal input terminal, so that the first transistor, the second transistor, the fourth transistor and the fifth transistor are turned off and the third transistor, the sixth transistor and the seventh transistor are turned on, and a reset signal is provided to the reset signal input terminal to reset a potential of the first electrode.

In some embodiments, during a second period of time, a high potential is provided to the first signal input terminal, a high potential is provided to the second signal input terminal, a low potential is provided to the third signal input terminal, and a high potential is provided to the fourth signal input terminal, so that the first transistor, the third transistor, the fifth transistor and the seventh transistor are turned off, the second transistor, the fourth transistor, the sixth transistor and the ninth transistor are turned on, and the eighth transistor is enabled to operate in an amplification region.

In some embodiments, during a third period of time, a low potential is provided to the first signal input terminal, a high potential is provided to the second signal input terminal, a high potential is provided to the third signal input terminal, and a low potential is provided to the fourth signal input terminal, so that the first transistor, the fifth transistor and the sixth transistor are turned on, and the second transistor, the third transistor, the fourth transistor, the seventh transistor, the eighth transistor and the ninth transistor are turned off.

In some embodiments, when the first electrode deforms upon sensing of a pressure, the capacitance formed by the first electrode and the second electrode increases, resulting in a decrease in a potential of the gate of the eighth transistor, such that the eighth transistor is enabled to operate in the amplification region, whose source outputs an amplified current of the gate current so as to be transmitted to the touch signal receiving line through the ninth transistor. The touch signal receiving line is used for transmitting the amplified current to the processing unit, and the processing unit is used for generating the touch signal based on the received current.

In some embodiments, the plurality of sensing units are uniformly distributed outside of an active area, and a pixel circuit in the pixel unit within the active area nearest to the sensing units is connected to a corresponding sensing unit.

Another embodiment of the disclosure provides a display device, comprising the display substrate according to any one of the above embodiments.

Yet another embodiment of the disclosure provides a driving method based on the display substrate according to the above embodiments, the method comprising: during a first period of time, providing a high potential to the first signal input terminal, providing a low potential to the second signal input terminal, providing a high potential to the third signal input terminal, and providing a low potential to the fourth signal input terminal, so that the first transistor, the second transistor, the fourth transistor and the fifth transistor are turned off, and the third transistor, the sixth transistor and the seventh transistor are turned on, and providing a reset signal to the reset signal input terminal to reset the potential of the first electrode.

In some embodiments, the driving method further comprises during a second period of time, providing a high potential to the first signal input terminal, providing a high potential to the second signal input terminal, providing a low potential to the third signal input terminal, and providing a high potential to the fourth signal input terminal, so that the first transistor, the third transistor, the fifth transistor and the seventh transistor are turned off, the second transistor, the fourth transistor, the sixth transistor and the ninth transistor are turned on, and the eighth transistor is enabled to operate in an amplification region.

In some embodiments, the driving method further comprises during a third period of time, providing a low potential to the first signal input terminal, providing a high potential to the second signal input terminal, providing a high potential to the third signal input terminal, and providing a low potential to the fourth signal input terminal, so that the first transistor, the fifth transistor and the sixth transistor are turned on, and the second transistor, the third transistor, the fourth transistor, the seventh transistor, the eighth transistor and the ninth transistor are turned off.

BRIEF DESCRIPTION OF DRAWINGS

Characteristics and advantages of each of the embodiments of the disclosure will be more readily understood with reference to the drawings. The drawings are merely exemplary and in no way intended to limit the invention, in which.

DETAILED DESCRIPTION OF EMBODIMENTS

Figure 1:
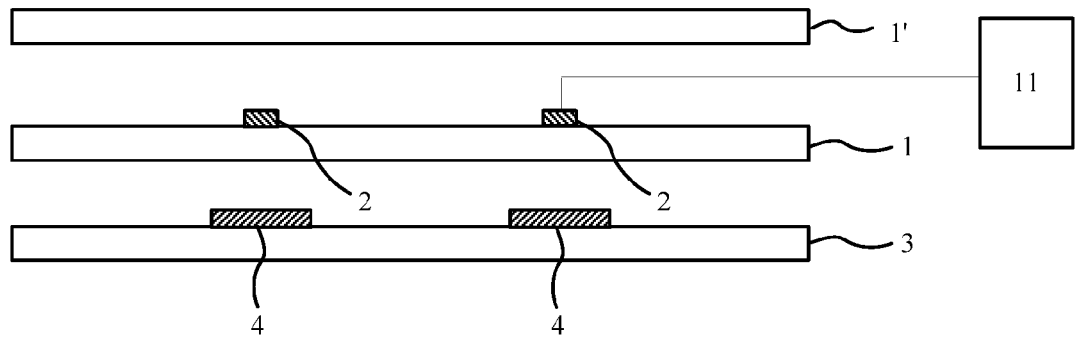
FIG. 1 is a schematic structural diagram of a display substrate according to an embodiment of the disclosure.

To further clarify the above objective, features and advantages of the present disclosure, a more particular description of the disclosure will be rendered with reference to the embodiments that are illustrated in the drawings. It is appreciated that embodiments of the disclosure and features in the embodiments can be combined as long as they do not conflict with one another.

Many details are set forth in the descriptions below so that the disclosure can be fully understood, but the invention can be implemented in other ways than those described herein, so the scope of the present invention is not limited to the specific embodiments disclosed herein.

In the specific descriptions below, the following reference signs are used to denote corresponding features:

1—base; 1'—cover plate; 2—first electrode; 3—middle frame; 4—second electrode; 5—organic light emitting device; 6—touch signal receiving line; 7—pixel circuit (unit); 8—sensing unit; 10—first signal input terminal; 20—second signal input terminal; 30—third signal input terminal; 40—fourth signal input terminal; 50—fifth signal input terminal; 60—sixth signal input terminal; 70—reset signal input terminal; T1—first transistor; T2—second transistor; T3—third transistor; T4—fourth transistor; T5—fifth transistor; T6—sixth transistor; T7—seventh transistor; T8—eighth transistor; T9—ninth transistor; C1—storage capacitor; C2—reference capacitor.

Figure 2:
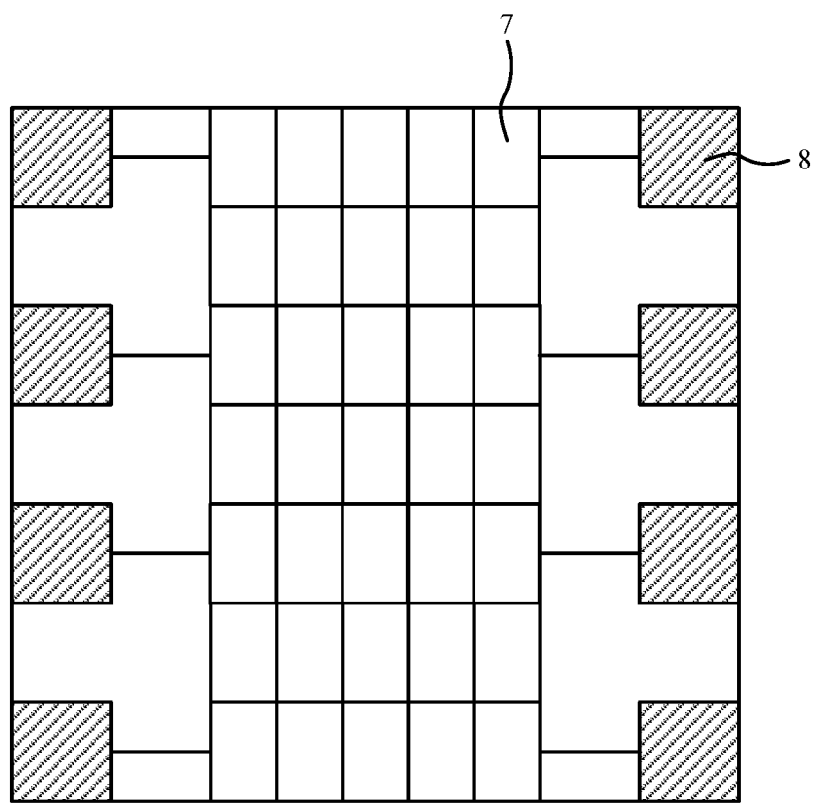
FIG. 2 is a schematic diagram of distribution of sensing units according to an embodiment of the disclosure.

Referring to FIG. 1 and FIG. 2, according to an embodiment of the disclosure, a display substrate is provided, which comprises a base 1, a middle frame 3 below the base and a pressure sensor for sensing touch operations to generate touch signals. The pressure sensor may include a plurality of sensing units 8, each comprising a first electrode 2, a second electrode 4 and a sensing circuit 11. The first electrode 2 may be disposed on the base 1 and may deform in response to the sensed touch pressure; the second electrode 4 may be disposed between the middle frame 3 and the base 1 and can form a capacitor with the first electrode 2, the capacitance of the capacitor may change with the deformation of the first electrode 1; and the sensing circuit 11 is electrically connected to the first electrode 2 for transforming changes in the capacitance into electrical signals so as to generate the touch signals.

In this embodiment of the disclosure, the second electrode is disposed on the middle frame, which can form a capacitor with the first electrode on the base, and the sensing circuit can generate the touch signals by means of changes in the capacitance of the capacitor resulted from touch operations, thus the pressure sensor is integrated into the display substrate. Moreover, this embodiment can help to reduce the space occupied by the pressure sensor in the display substrate, without requiring substantial modification to the structure of the display substrate. In this way, a display device using the display substrate of the embodiment of the disclosure may enable a customer to have a better experience in human-computer interaction without further complicating the structure of the display substrate.

In the embodiment shown in FIG. 1, a glass cover plate 1' as well as other elements like a thin film transistor may also be disposed above the base 1. In addition, in case the middle frame 3 is made from an electrically conductive material, an insulating layer may be arranged between the first electrode 2 and the middle frame 3.

In some embodiments of the disclosure, the first electrode 2 may be formed in the same layer as any one of a bottom electrode layer of a storage capacitor (e.g. capacitor $C_1$ in FIG. 4) in a pixel circuit of a pixel unit of the display device, a gate layer, a source layer and a drain layer of the thin film transistor. According to an embodiment of the disclosure, the pixel circuit may be of a 6T1C (6 transistors and 1 storage capacitor $C_1$) structure, details of which will be described below with reference to FIG. 4. In the embodiment shown in FIG. 4, a source of a first thin film transistor T1 and a drain of a second thin film transistor T2 may serve as the two ends of the storage capacitor $C_1$.

The display substrate proposed in the embodiments of the disclosure can be applied to various types of display devices. As for a LCD display device, the middle frame can be a frame for fixing a light guide plate in a backlight; as for an OLED display device, the middle frame can be a frame for fixing the base. For example, the display substrate provided in the embodiment of the present disclosure may be applied to a mobile phone, in which the middle frame can be used for fixing the base and further may be used for accommodating and fixing elements like a driving circuit of the pixel unit, a graphics processor, etc.

Figure 3:
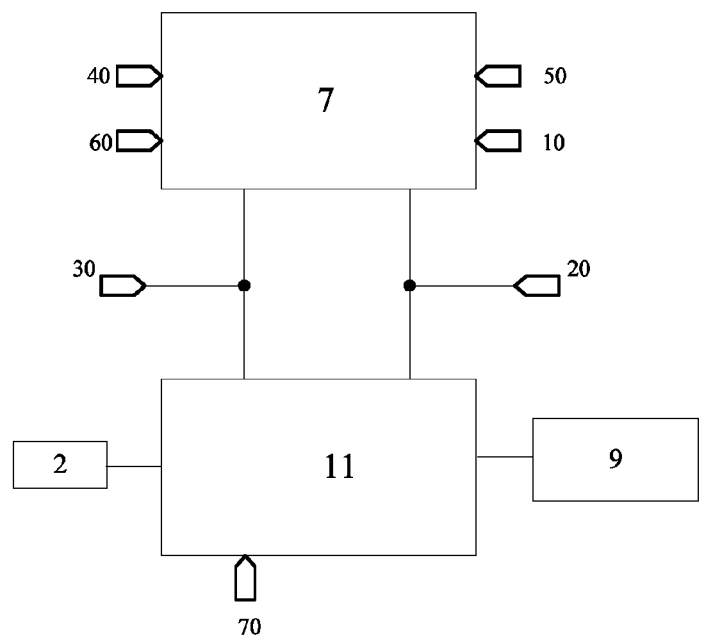
FIG. 3 is a schematic diagram for showing the electrical connection between a pixel circuit and a sensing circuit according to an embodiment of the disclosure.

Referring to FIG. 2, in some embodiments of the present disclosure, the display substrate further comprises a plurality of pixel units, each including a pixel circuit 7, and pixel circuits 7 of some of the plurality of pixel units can be connected to the pressure sensor. FIG. 3 schematically shows the electrical connection between the pixel circuit 7 and the sensing circuit 11 in the pressure sensor. As shown in FIG. 3, the pixel circuit 7 has a first signal input terminal 10 for receiving a light emission control signal, a second signal input terminal 20 for receiving a second control signal, a third signal input terminal 30 for receiving a third control signal, a fourth signal input terminal 40 for receiving a data signal, a fifth signal input terminal 50 for receiving a first voltage and a sixth signal input terminal 60 for receiving a second voltage. The sensing circuit 11 has a reset signal input terminal 70, through which the sensing circuit 11 receives a reset signal to reset an electrical potential of the first electrode 2. The sensing circuit 11 is electrically connected with the second signal input terminal 20 and third signal input terminal 30 of the pixel circuit 7 so as to sense touch operations by a user under the control of the second control signal and the third control signal.

As shown in FIG. 3, the pressure sensor may further comprise a processing unit 9, which is electrically connected to the sensing circuit 11 to generate touch control signals based on changes in the capacitance of the capacitor.

The details of the pixel circuit 7 and the sensing circuit 11 will be illustrated below by way of example, but those skilled in the art shall understand that the specific circuits of the pixel circuit 7 and the sensing circuit 11 may not be limited to the illustrated example, and modifications or variations can be made to the example disclosed herein under the teaching of the principle revealed in this application.

Figure 4:
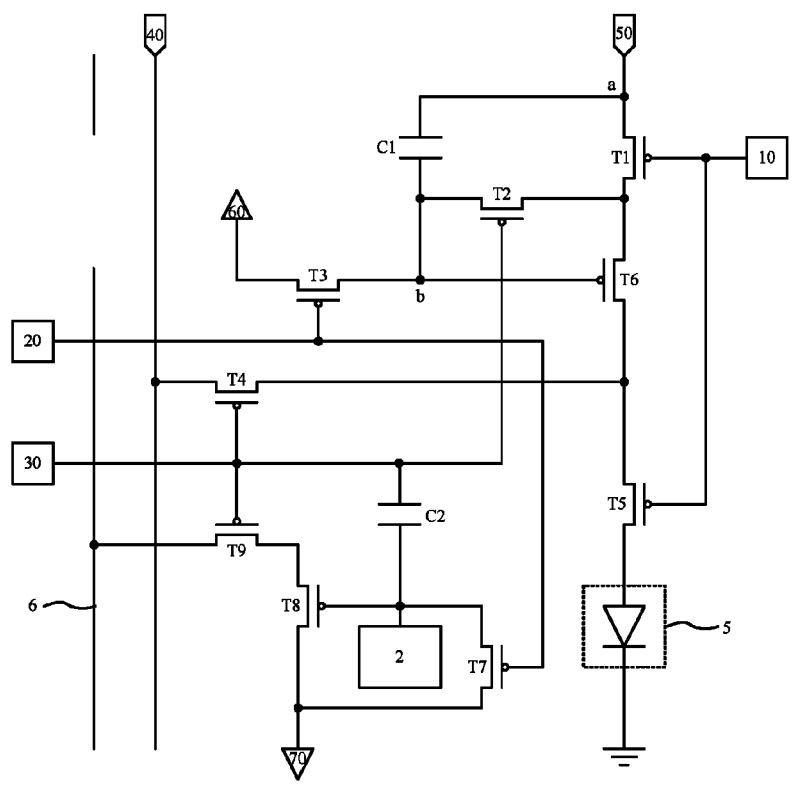
FIG. 4 is a schematic circuit of a pixel circuit and a sensing circuit according to an embodiment of the disclosure.

FIG. 4 is a schematic diagram of circuits of a pixel circuit and a sensing circuit according to an embodiment of the disclosure. As shown in FIG. 4, the sensing circuit may include a seventh transistor T7, an eighth transistor T8, a ninth transistor T9 and a reference capacitor C2. A gate of the seventh transistor T7 is connected to the second signal input terminal 20, a source of the seventh transistor T7 may be connected to a gate of the eighth transistor T8, and a drain of the seventh transistor T7 can be connected to a drain of the eighth transistor T8. A gate of the eighth transistor T8 is connected to the reference capacitor C2, a source of the eighth transistor T8 may be connected to a drain of the ninth transistor T9, and a drain of the eighth transistor T8 is connected to the reset signal input terminal. A gate of the ninth transistor T9 is connected to the third signal input terminal 30, and a source of the ninth transistor T9 may be connected to a touch signal receiving line 6. One end of the reference capacitor C2 is connected to the first electrode 2, and the other end thereof may be connected to the third signal input terminal 30.

In the example shown by FIG. 4, the first voltage received at the fifth signal input terminal 50 may be a high electrical potential, and the voltage received at the sixth signal input terminal 60 may be a low electrical potential.

As mentioned previously, in the embodiment of the present disclosure, the pixel circuit may have a structure of 6T1C (6 transistors and 1 storage capacitor). Referring to FIG. 4, the pixel circuit may include a first transistor T1, a second transistor T2, a third transistor T3, a fourth transistor T4, a fifth transistor T5, a sixth transistor T6 and a storage capacitor C1. The gate of the first transistor T1 is connected to the first signal input terminal 10, the source of the first transistor T1 can be connected to the fifth signal input terminal 50, and the drain of the first transistor T1 can be connected to the source of the sixth transistor T6. The gate of the second transistor T2 is connected to the third signal input terminal 30, the source of the second transistor T2 can be connected to the drain of the first transistor T1, and the drain of the second transistor T2 can be connected to the gate of the sixth transistor T6. The gate of the third transistor T3 is connected to the second signal input terminal 20, the source of the third transistor T3 can be connected to the sixth signal input terminal 60, and the drain of the third transistor T3 can be connected to the gate of the sixth transistor T6. The gate of the fourth transistor T4 is connected to the third signal input terminal 30, the source of the fourth transistor T4 can be connected to the fourth signal input terminal 40, and the drain of the fourth transistor T4 is connected to the drain of the sixth transistor T6. The gate of the fifth transistor T5 is connected to the first signal input terminal 10, the source of the fifth transistor T5 can be connected to the drain of the sixth transistor T6, and the drain of the fifth transistor T5 is connected to an organic light emitting device 5. The gate of the sixth transistor T6 is connected to the storage capacitor C1. One end of the storage capacitor C1 is connected to the fifth signal input terminal 50, and the other end thereof is connected to the gate of the sixth transistor T6. In the example shown by FIG. 4, the first transistor T1, second transistor T2, third transistor T3, fourth transistor T4, fifth transistor T5, sixth transistor T6, seventh transistor T7, eighth transistor T8 and ninth transistor T9 are P-channel transistors. The P-channel transistors will be turned on when a low electrical potential is input into the gate. It shall be appreciated that in alternative embodiments, the transistors may also be N-channel transistors.

Therefore, the pixel circuit in the embodiment shown in FIG. 4 is of 6T1C circuit, and the sensing circuit in the pressure sensor includes three transistors and one reference capacitor, i.e. the sensing circuit cooperates with the first electrode through three transistors and one capacitor. The touch signal receiving line 6 as provided is for transporting relevant physical quantity of the touch signal into the processing unit 9.

In the example shown by FIG. 4, the seventh transistor T7 in the sensing circuit is a signal reset transistor (Pre-Charge TFT), the eighth transistor T8 is a signal amplification transistor (Amplifier TFT), and the ninth transistor T9 is a switching transistor (Switching TFT). In the pixel circuit, the first transistor T1, second transistor T2, third transistor T3, fourth transistor T4 and fifth transistor T5 are switching transistors, and the sixth transistor T6 is a driving transistor (Driving TFT), which operates in a saturated state.

In the example shown by FIG. 4, signals received at the first signal input terminal 10, the second signal input terminal 20, the third signal input terminal 30 and the fourth signal input terminal 40 are used for controlling the ON and OFF of the transistors in the pixel circuit and the sensing circuit. The third signal input terminal 30 may be used to receive a scanning signal. Now the operating process of the pixel circuit and sensing circuit as shown in FIG. 4 will be described with reference to the signal sequence diagram shown in FIG. 5.

Figure 5:
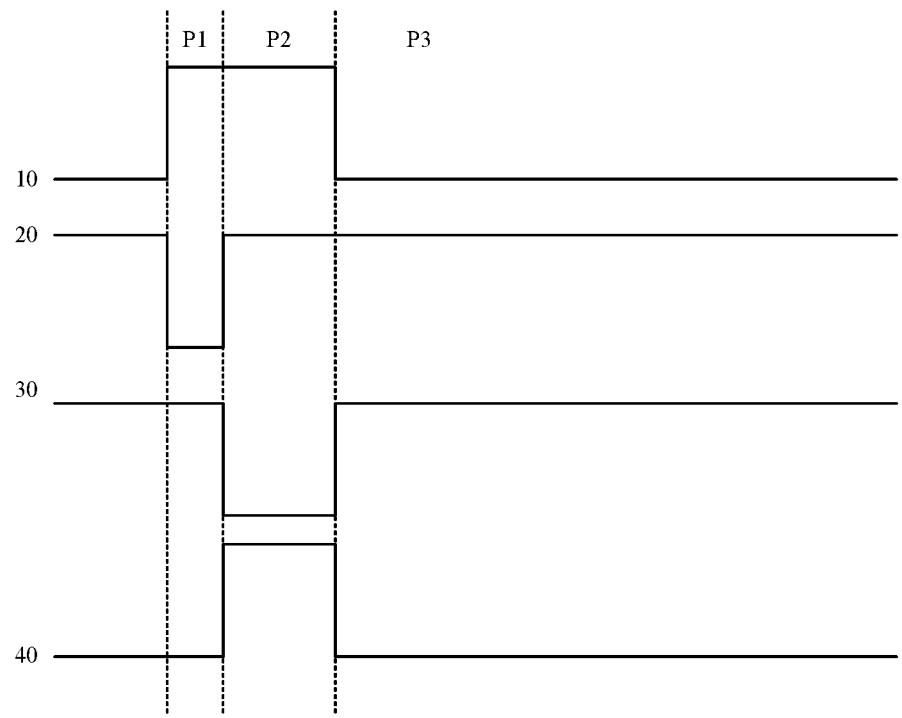
FIG. 5 is a sequence diagram of input signals that are applied to the pixel circuit and sensing circuit as shown in FIG. 4 according to an embodiment of the disclosure.

As shown in FIG. 5, in a first period of time P1, a high potential is input to the first signal input terminal 10, a low potential is input to the second signal input terminal 20, a high potential is input to the third signal input terminal 30, and a low potential is input to the fourth signal input terminal 40, so that the first transistor T1, the second transistor T2, the fourth transistor T4 and the fifth transistor T5 are turned off and the third transistor T3, the sixth transistor T6 and the seventh transistor T7 are turned on. The reset signal input terminal 70 receives a reset signal to reset the potential of the first electrode 2.

During the first period of time P1, a low potential is input to the second signal input terminal 20, hence the seventh transistor T7 is turned on, and the reset signal received at the reset signal input terminal 70 is provided to the first electrode 2 after passing through the drain and source of the seventh transistor T7, so that the potential of the first electrode 2 is reset. The reset signal may be of, for example, zero potential (reference potential), then the potential of the first electrode 2 will be reset to a zero potential, and the eighth transistor T8 can be put into an OFF state.

Meanwhile, a low potential is input to the second signal input terminal 20 to turn on the third transistor T3, so the low potential signal at the sixth signal input terminal 60 can be transmitted to the drain of the third transistor T3 to set the potential at node b as a low potential. By setting the potential of the first electrode 2 to be zero and setting the potential at node b to be a low potential, a preparation is made for the first electrode 2 to sense pressures to generate touch signals in the next period of time.

During a second period of time P2, a high potential is input to the first signal input terminal 10, a high potential is input to the second signal input terminal 20, a low potential is input to the third signal input terminal 30, and a high potential is input to the fourth signal input terminal 40, so that the first transistor T1, the third transistor T3, the fifth transistor T5 and the seventh transistor T7 are turned off, the second transistor T2, the fourth transistor T4, the sixth transistor T6 and the ninth transistor T9 are turned on, and the eighth transistor T8 is enabled to operate in an amplification region.

When the first electrode 2 senses an applied pressure, it will come closer to the second electrode 4, as a result, the capacitance $C_f$ formed by the first electrode 2 and the second electrode 3 increases. When $C_f$ becomes large enough as compared to the reference capacitor C2 and a parasitic capacitance $C_t$ of the eighth transistor T8 (i.e. a ratio between $C_f$ and $(C_2+C_t)$ is greater than a preset value), the potential of the gate of the eighth transistor T8 will decrease such that the eighth transistor may operate in the amplification region, thereby it can function to amplify, and the gate current of the eighth transistor is amplified several times before it is transmitted to the touch signal receiving line 6 through the drain and source of the ninth transistor, and is further transmitted to the processing unit 9. The processing unit 9 can calculate the strength of touch operation from this current.

During the second period of time, the second transistor T2 and the fourth transistor T4 are turned on, and owing to the function of the storage capacitor C1, node b will maintain the low potential as in the first period of time P1, thus, the high potential ($V_{data}$) at the fourth signal input terminal 40 at this time will charge node b through the fourth transistor T4, the sixth transistor T6 and the second transistor T2 until the potential of node b is equal to $V_{data}+V_{th}$ ($V_{th}$ is a threshold of a voltage difference between the gate and source of the sixth transistor T6, and for P-channel transistors, $V_{th}$ is a negative value). In this process, since a first voltage terminal 50 connected to node a has a high potential $V_{dd}$, the potential of node a is still a high potential $V_{dd}$, namely, the end of the storage capacitor C1 connected to the first voltage terminal 50 stays at a high potential, thereby ensuring that the potential of node b remains to be $V_{data}+V_{th}$ after charging. In addition, since the fifth transistor T5 is in an OFF state, current will not flow through the organic light emitting device 5, thus reducing power consumption of the organic light emitting device 5.

In a third period of time P3, a low potential is input to the first signal input terminal 10, a high potential is input to the second signal input terminal 20, a high potential is input to the third signal input terminal 30, and a low potential is input to the fourth signal input terminal 40, so that the first transistor T1, the fifth transistor T5 and the sixth transistor T6 are turned on, and the second transistor T2, the third transistor T3, the fourth transistor T4, the seventh transistor T7, the eighth transistor T8 and the ninth transistor T9 are turned off.

In the third period of time P3, transistors in the sensing circuit are turned off, and the pressure sensor stops operating.

In the pixel circuit, the first voltage received at the fifth signal input terminal 50 can be transmitted to the organic light emitting device 5 via the first transistor T1, the sixth transistor T6 and the fifth transistor T5, causing the organic light emitting device 5 to emit light.

The operating current of the organic light emitting device can be calculated from the TFT saturation current formula as follows:

$$I_{OLED} = K(V_{GS} - V_{th})^2$$
$$= K[(V_{data} + V_{th}) - V_{dd} - V_{th}]^2$$
$$= K(V_{data} - V_{dd})^2$$

In the above formula, $V_{GS}$ is a voltage between the gate and source of the sixth transistor T6, and it can be seen from the above formula that the operating current $I_{OLED}$ of the organic light emitting device is not influenced by $V_{th}$ at this time, but it is only dependent on $V_{dd}$ and $V_{data}$. Thus the problem concerning influence to $I_{OLED}$ caused by drift of the threshold voltage $V_{th}$ of the sixth transistor T6 due to the manufacturing process and the long-time operation is overcome, and normal operation of the organic light emitting device is guaranteed.

In the embodiment shown in FIG. 4, the first electrode 2 deforms in response to sensing of a pressure, causing the capacitance of the capacitor formed by the first electrode 2 and the second electrode to increase, thereby reducing the gate potential of the eighth transistor T8 and enabling the eighth transistor to operate in an amplification region. The source of the eighth transistor T8 will output amplified current of the gate current, which is transmitted to the touch signal receiving line 6 through the ninth transistor T9, and the touch signal receiving line 6 can transmit the amplified current to the processing unit 9. The processing unit 9 is used for generating a touch signal based on the received current.

As shown in FIG. 2, in an embodiment of the present disclosure, the plurality of sensing units 8 may be uniformly distributed outside of an active area, and a pixel circuit in the pixel unit 7 within the active area nearest to the sensing units 8 can be connected to a corresponding sensing unit 8. Thus the sensing units 8 will not have any impact on the active area of the display device, and the sensing units can be arranged without changing the wiring and structure of the pixel unit.

In case the display substrate in this embodiment is applied to an OLED display device, as no backlight is required, the second electrode on the middle frame almost has no influence to the light emitting effect of the display substrate. Hence in this case, sensing units can also be uniformly distributed below the pixel units within the active area so as to increase sensitivity and accuracy of sensing of the pressure.

Figure 6:
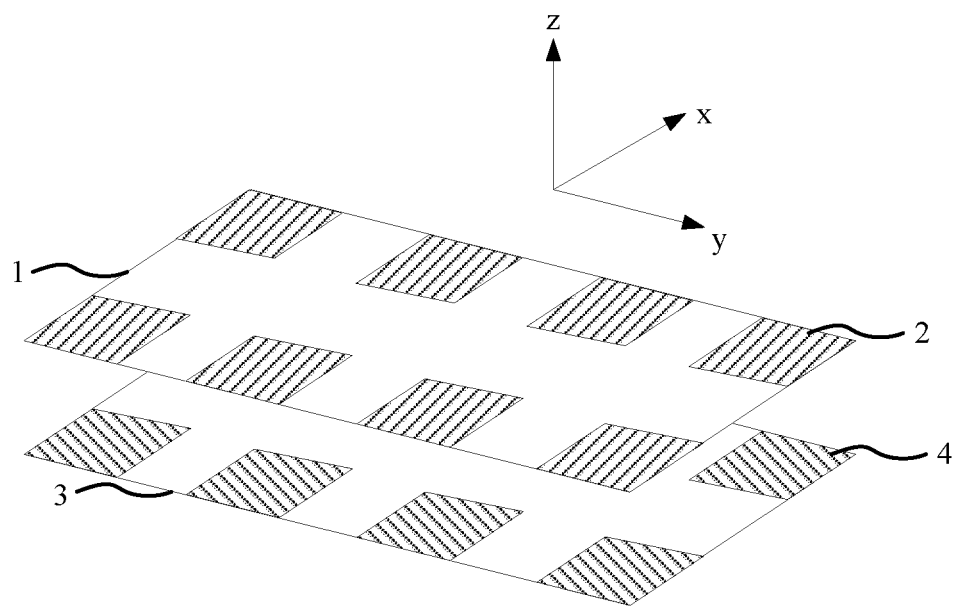
FIG. 6 is a schematic diagram showing directions of the sensed pressures according to an embodiment of the disclosure.

As shown in FIG. 6, the pressure sensor provided in the embodiment of the disclosure is mainly used for sensing displacement of a finger or a touch component in direction z (a direction perpendicular to the substrate). As for displacement in directions x and y, it can be sensed by methods known in the prior art, which will not be elaborated herein.

Another embodiment of the disclosure provides a display device, which may comprise the display substrate described in any of the above embodiments.

The display device in the embodiment of the disclosure can be any product or component having a display function, such as liquid crystal panel, electronic paper, OLED panel, mobile phone, tablet computer, television, laptop computer, digital photo frame, navigator, etc.

Still another embodiment of the disclosure provides a driving method based on the display substrate described in the above embodiments, which comprises the following step: during a first period of time, providing a high potential to the first signal input terminal, providing a low potential to the second signal input terminal, providing a high potential to the third signal input terminal, and providing a low potential to the fourth signal input terminal, so that the first transistor, the second transistor, the fourth transistor and the fifth transistor are turned off and the third transistor, the sixth transistor and the seventh transistor are turned on, and providing a reset signal to the reset signal input terminal to reset the potential of the first electrode.

In an embodiment of the disclosure, the method further comprises: during a second period of time, providing a high potential to the first signal input terminal, providing a high potential to the second signal input terminal, providing a low potential to the third signal input terminal, and providing a high potential to the fourth signal input terminal, so that the first transistor, the third transistor, the fifth transistor and the seventh transistor are turned off, the second transistor, the fourth transistor, the sixth transistor and the ninth transistor are turned on, and the eighth transistor is enabled to operate in an amplification region.

In an embodiment of the present disclosure, the method further comprises: during a third period of time, providing a low potential to the first signal input terminal, providing a high potential to the second signal input terminal, providing a high potential to the third signal input terminal, and providing a low potential to the fourth signal input terminal, so that the first transistor, the fifth transistor and the sixth transistor are turned on, and the second transistor, the third transistor, the fourth transistor, the seventh transistor, the eighth transistor and the ninth transistor are turned off.

In the above described embodiments of the present disclosure, the so-called "high potential" or "high electrical potential" may refer to a positive potential higher than zero potential (reference potential), and the so-called "low potential" or "low electrical potential" may refer to a negative potential lower than zero potential (reference potential).

The embodiments of the disclosure have been described in detail above with reference to the drawings. By arranging a pressure sensor in the display substrate, the pressure sensing function is integrated into the display substrate, meanwhile, the pixel units and the pressure sensor are controlled synchronously by providing external signals, and it is unnecessary to separately provide a sequence circuit for the pressure sensor, so wiring of the pressure sensor is simplified.

It shall be noted that in the figures, the sizes of layers and areas may be exaggerated for the sake of giving a clear view. Moreover, it can be appreciated that when a certain element or layer is referred to as being "above" another element or layer, it may be immediately located on said another element or layer, or there may be an intermediate layer therebetween. In addition, it can be understood that when a certain element or layer is referred to as being "below" another element or layer, it may be immediately located under said another element or layer, or there may be more than one intermediate layer or element. Moreover, it shall also be noted that when a certain layer or element is referred to as being "between" two layers or two elements, it may be the only layer or element between said two layers or elements, or there may be more than one intermediate layer or element. Like reference numerals indicate similar elements throughout.

In this context of the disclosure, the terms "first", "second", "third", "fourth", "fifth", "sixth", "seventh", "eighth" and "ninth" are used for descriptive purposes only, but they do not indicate or suggest relative importance. The term "multiple" or "a plurality of" refer to two or more unless otherwise defined.

The above described are merely some of the embodiments of the disclosure, but they do not intend to limit the invention. To a person having an ordinary skill in the art, there are many modifications and variations to the described embodiments. Any modifications, equivalent substitutions and improvements made within the spirit and principle disclosed by the embodiments of the present disclosure shall fall into the scope of the invention.

The invention claimed is:

1. A display substrate, comprising:
   a base;
   a middle frame below the base; and
   a pressure sensor for sensing a touch operation to generate a touch signal;
   wherein the pressure sensor includes a plurality of sensing units, each sensing unit comprising:
      a first electrode on the base, which deforms in response to a sensed touch pressure;
      a second electrode between the middle frame and the base, which is configured to form a capacitor with the first electrode, a capacitance of the capacitor changing with the deformation of the first electrode; and
      a sensing circuit electrically connected to the first electrode for transforming changes in the capacitance into electrical signal so as to generate the touch signal,
      when the pressure sensor further comprises a processing unit that generates the touch signal based on the change in the capacitance of the capacitor,
      wherein the sensing circuit comprises a seventh transistor, and eighth transistor, a ninth transistor and a reference capacitor,
   wherein a gate of the seventh transistor is connected to the second signal input terminal, a source thereof is connected to a gate of the eighth transistor, and a drain thereof is connected to a drain of the eighth transistor,
   wherein a gate of the eighth transistor is connected to the reference capacitor, a source thereof connected to a drain of the ninth transistor, and the drain thereof is further connected to the reset signal input terminal,
   wherein a gate of the ninth transistor is connected to the third signal input terminal, and a source thereof is connected to a touch signal receiving line;
   wherein one end of the reference capacitor is connected to the first electrode and the other end thereof is connected to the third signal input terminal.

2. The display substrate according to claim 1, wherein the display substrate further comprises a plurality of pixel units, each pixel unit including a pixel circuit, and pixel circuits of part of the plurality of pixel units are connected to the pressure sensor,
   wherein the pixel circuit has a first signal input terminal for receiving a light emission control signal, a second signal input terminal for receiving a second control signal, a third signal input terminal for receiving a third control signal, a fourth signal input terminal for receiving a data signal, a fifth signal input terminal for receiving a first voltage and a sixth signal input terminal for receiving a second voltage,
   wherein the sensing circuit has a reset signal input terminal, through which the sensing circuit receives a reset signal to reset a potential of the first electrode, and the sensing circuit is electrically connected to the second signal input terminal and third signal input terminal of the pixel circuit to sense touch operations of a user under the control of the second control signal and the third control signal.

3. The display substrate according to claim 1, wherein the first voltage is a high potential, and the second voltage is a low potential, the pixel circuit comprises a first transistor, a second transistor, a third transistor, a fourth transistor, a fifth transistor, a sixth transistor, and a storage capacitor,
   wherein a gate of the first transistor is connected to the first signal input terminal, a source thereof is connected to the fifth signal input terminal, and a drain thereof is connected to a source of the sixth transistor,
   wherein a gate of the second transistor is connected to the third signal input terminal, a source thereof is connected to the drain of the first transistor, and a drain thereof is connected to a gate of the sixth transistor,
   wherein a gate of the third transistor is connected to the second signal input terminal, a source thereof is connected to the sixth signal input terminal, and a drain thereof is connected to a gate of the sixth transistor,
   wherein a gate of the fourth transistor is connected to the third signal input terminal, a source thereof is connected to the fourth signal input terminal, and a drain thereof is connected to a drain of a sixth transistor;
   wherein a gate of the fifth transistor is connected to the first signal input terminal, a source thereof is connected to the drain of the sixth transistor, and a drain thereof is connected to an organic light emitting device;
   wherein a gate of the sixth transistor is connected to the storage capacitor, one end of the storage capacitor is connected to the fifth signal input terminal, and the other end thereof is connected to the gate of the sixth transistor.

4. The display substrate according to claim 3, wherein the first transistor, second transistor, third transistor, fourth transistor, fifth transistor, sixth transistor, seventh transistor, eighth transistor, and ninth transistor are P-channel transistors.

5. The display substrate according to claim 4, wherein during a first period of time, a high potential is provided to the first signal input terminal, a low potential is provided to the second signal input terminal, a high potential is provided to the third signal input terminal, and a low potential is provided to the fourth signal input terminal, so that the first transistor, the second transistor, the fourth transistor and the fifth transistor are turned off and the third transistor, the sixth transistor and the seventh transistor are turned on, and a reset signal is provided to the reset signal input terminal to reset a potential of the first electrode.

6. The display substrate according to claim 5, wherein during a second period of time, a high potential is provided to the first signal input terminal, a high potential is provided to the second signal input terminal, a low potential is provided to the third signal input terminal, and a high potential is provided to the fourth signal input terminal, so that the first transistor, the third transistor, the fifth transistor and the seventh transistor are turned off, the second transistor, the fourth transistor, the sixth transistor and the ninth transistor are turned on, and the eighth transistor is enabled to operate in an amplification region.

7. The display substrate according to claim 6, wherein during a third period of time, a low potential is provided to the first signal input terminal, a high potential is provided to the second signal input terminal, a high potential is provided to the third signal input terminal, and a low potential is provided to the fourth signal input terminal, so that the first transistor, the fifth transistor and the sixth transistor are turned on, and the second transistor, the third transistor, the fourth transistor, the seventh transistor, the eighth transistor and the ninth transistor are turned off.

8. The display substrate according to claim 6, wherein when the first electrode deforms upon sensing of a pressure, the capacitance formed by the first electrode and the second electrode increases, resulting in a decrease in a potential of the gate of the eighth transistor, such that the eighth transistor is enabled to operate in the amplification region, whose source outputs an amplified current of the gate current so as to be transmitted to the touch signal receiving line through the ninth transistor, wherein the touch signal receiving line is used for transmitting the amplified current to the processing unit, and the processing unit is used for generating the touch signal based on the received current.

9. A driving method based on the display substrate according to claim 3, the driving method comprising:

during a first period of time, providing a high potential to the first signal input terminal, providing a low potential to the second signal input terminal, providing a high potential to the third signal input terminal, and providing a low potential to the fourth signal input terminal, so that the first transistor, the second transistor, the fourth transistor and the fifth transistor are turned off, and the third transistor, the sixth transistor and the seventh transistor are turned on, and providing a reset signal to the reset signal input terminal to reset the potential of the first electrode.

10. The method according to claim 9, further comprising:

during a second period of time, providing a high potential to the first signal input terminal, providing a high potential to the second signal input terminal, providing a low potential to the third signal input terminal, and providing a high potential to the fourth signal input terminal, so that the first transistor, the third transistor, the fifth transistor and the seventh transistor are turned off, the second transistor, the fourth transistor, the sixth transistor and the ninth transistor are turned on, and the eighth transistor is enabled to operate in an amplification region.

11. The method according to claim 10, further comprising:

during a third period of time, providing a low potential to the first signal input terminal, providing a high potential to the second signal input terminal, providing a high potential to the third signal input terminal, and providing a low potential to the fourth signal input terminal, so that the first transistor, the fifth transistor and the sixth transistor are turned on, and the second transistor, the third transistor, the fourth transistor, the seventh transistor, the eighth transistor and the ninth transistor are turned off.

12. The display substrate according to claim 1, wherein the plurality of sensing units are uniformly distributed outside of an active area, and a pixel circuit in the pixel unit within the active area nearest to the sensing units is connected to a corresponding sensing unit.

13. A display device, comprising a display substrate, the display substrate comprising:

a base;
a middle frame below the base; and
a pressure sensor for sensing a touch operation to generate a touch signal;
wherein the pressure sensor includes a plurality of sensing units, each sensing unit comprising:
a first electrode on the base, which deforms in response to a sensed touch pressure;
a second electrode between the middle frame and the base, which is configured to form a capacitor with the first electrode, a capacitance of the capacitor changing with the deformation of the first electrode; and
a sensing circuit electrically connected to the first electrode for transforming changes in the capacitance into electrical signal so as to generate the touch signal
wherein the pressure sensor further comprises a processing unit that generates the touch signal based on the change in the capacitance of the capacitor,
wherein the sensing circuit comprises a seventh transistor, and eighth transistor, a ninth transistor and a reference capacitor,
wherein a gate of the seventh transistor is connected to the second signal input terminal, a source thereof is connected to a gate of the eighth transistor, and a drain thereof is connected to a drain of the eighth transistor,
wherein a gate of the eighth transistor is connected to the reference capacitor, a source thereof connected to a drain of the ninth transistor, and the drain thereof is further connected to the reset signal input terminal,
wherein a gate of the ninth transistor is connected to the third signal input terminal, and a source thereof is connected to a touch signal receiving line;
wherein one end of the reference capacitor is connected to the first electrode and the other end thereof is connected to the third signal input terminal.

14. The display device according to claim 13, wherein the first voltage is a high potential, and the second voltage is a low potential, the pixel circuit comprises a first transistor, a second transistor, a third transistor, a fourth transistor, a fifth transistor, a sixth transistor, and a storage capacitor, wherein a gate of the first transistor is connected to the first signal input terminal, a source thereof is connected to the fifth signal input terminal, and a drain thereof is connected to a source of the sixth transistor,
wherein a gate of the second transistor is connected to the third signal input terminal, a source thereof is connected to the drain of the first transistor, and a drain thereof is connected to a gate of the sixth transistor,
wherein a gate of the third transistor is connected to the second signal input terminal, a source thereof is connected to the sixth signal input terminal, and a drain thereof is connected to a gate of the sixth transistor,
wherein a gate of the fourth transistor is connected to the third signal input terminal, a source thereof is connected to the fourth signal input terminal, and a drain thereof is connected to a drain of a sixth transistor;
wherein a gate of the fifth transistor is connected to the first signal input terminal, a source thereof is connected to the drain of the sixth transistor, and a drain thereof is connected to an organic light emitting device;
wherein a gate of the sixth transistor is connected to the storage capacitor, one end of the storage capacitor is connected to the fifth signal input terminal, and the other end thereof is connected to the gate of the sixth transistor.

15. The display device according to claim 14, wherein the first transistor, second transistor, third transistor, fourth transistor, fifth transistor, sixth transistor, seventh transistor, eighth transistor, and ninth transistor are P-channel transistors.

* * * * *